(12) United States Patent
Goto et al.

(10) Patent No.: US 9,403,343 B2
(45) Date of Patent: Aug. 2, 2016

(54) ALUMINUM PLATED STEEL SHEET HAVING EXCELLENT CORROSION RESISTANCE WITH RESPECT TO ALCOHOL OR MIXED GASOLINE OF SAME AND APPEARANCE

(75) Inventors: Yasuto Goto, Tokyo (JP); Masao Kurosaki, Tokyo (JP); Shinichi Yamaguchi, Tokyo (JP); Jun Maki, Tokyo (JP)

(73) Assignee: NIPPON STEEL & SUMITOMO METAL CORPORATION, TOKYO (JP)

( * ) Notice: Subject to any disclaimer, the term of this patent is extended or adjusted under 35 U.S.C. 154(b) by 0 days.

(21) Appl. No.: 14/130,352

(22) PCT Filed: Jul. 14, 2011

(86) PCT No.: PCT/JP2011/066627
§ 371 (c)(1),
(2), (4) Date: Dec. 31, 2013

(87) PCT Pub. No.: WO2013/008341
PCT Pub. Date: Jan. 17, 2013

(65) Prior Publication Data
US 2014/0205857 A1    Jul. 24, 2014

(51) Int. Cl.
*B32B 15/01* (2006.01)
*C23C 2/26* (2006.01)
(Continued)

(52) U.S. Cl.
CPC ............ *B32B 15/012* (2013.01); *C22C 21/02* (2013.01); *C22C 21/04* (2013.01); *C22C 21/06* (2013.01);
(Continued)

(58) Field of Classification Search
CPC ............ C23C 2/12; C23C 2/26; C23C 2/28; C23C 30/00; C23C 30/005; B32B 1/02; B32B 15/012; C22C 21/02; C22C 21/04; C22C 21/06; C22C 21/08; C22C 21/00; Y10T 428/12757; Y10T 428/1275; Y10T 428/12972; Y10T 428/12979; Y10T 428/2495; Y10T 428/24967; Y10T 428/24975; Y10T 428/264; Y10T 428/265
USPC ................ 428/653, 654, 684, 685, 335, 336; 420/544, 546
See application file for complete search history.

(56) References Cited

U.S. PATENT DOCUMENTS 3,397,056 A     8/1968  Layne et al.
6,017,643 A *   1/2000  Kobayashi ............... C23C 2/12
                                                    118/407
(Continued)

FOREIGN PATENT DOCUMENTS

CN    1145645       3/1997
JP    06-306637     11/1994
(Continued)

OTHER PUBLICATIONS

Machine Translation, Masao et al., JP 2000-328216, Nov. 2000.*
International Search Report dated Oct. 25, 2011 issued in corresponding PCT Application No. PCT/JP2011/066627 [With English Translation].
European Search Report dated Jun. 6, 2015 issued in corresponding European Application No. 11869319.1.

*Primary Examiner* — Michael E La Villa
(74) *Attorney, Agent, or Firm* — Kenyon & Kenyon LLP

(57) ABSTRACT

The present invention relates to aluminum plated steel sheet which does not require coating after plating and is high in production flexibility enabling application of conventional production processes as they are or exhibits excellent corrosion resistance to flex fuels and further is excellent in appearance and to fuel tanks characterized by being produced using the steel sheet. The Si, Mg, Ca, and Ti ingredients in the aluminum plating layer are defined and the cooling method after hot dip aluminum coating is controlled to make $Mg_2Si$ particles with a long axis of 10 µm or less and an aspect ratio of 1 to 3 finely disperse in the plating layer. Due to the $Mg_2Si$ particles, it is possible to give an excellent corrosion resistance to flex fuels and suppress the deterioration in appearance due to MgO.

4 Claims, 1 Drawing Sheet

(51) Int. Cl.
*C23C 2/28* (2006.01)
*C22C 21/04* (2006.01)
*C23C 2/12* (2006.01)
*C22C 21/02* (2006.01)
*C22C 21/06* (2006.01)
*C23C 30/00* (2006.01)

(52) U.S. Cl.
CPC ... *C23C 2/12* (2013.01); *C23C 2/26* (2013.01); *C23C 2/28* (2013.01); *C23C 30/00* (2013.01); *Y10T 428/1275* (2015.01); *Y10T 428/12757* (2015.01); *Y10T 428/12764* (2015.01); *Y10T 428/12972* (2015.01); *Y10T 428/12979* (2015.01); *Y10T 428/2495* (2015.01); *Y10T 428/24967* (2015.01); *Y10T 428/24975* (2015.01); *Y10T 428/264* (2015.01); *Y10T 428/265* (2015.01)

(56) References Cited

U.S. PATENT DOCUMENTS

| | | | | |
|---|---|---|---|---|
| 6,635,359 | B1 * | 10/2003 | Kurosaki et al. | 428/653 |
| 6,649,282 | B1 * | 11/2003 | Yamaguchi et al. | 428/648 |
| 6,709,770 | B2 * | 3/2004 | Komatsu et al. | 428/659 |

FOREIGN PATENT DOCUMENTS

| | | |
|---|---|---|
| JP | 2000-290763 | 10/2000 |
| JP | 2000-328168 | 11/2000 |
| JP | 2000328216 | 11/2000 |
| JP | 2001-073108 | 3/2001 |
| JP | 2004244655 | 9/2004 |
| JP | 2005272967 | 10/2005 |
| JP | 2007-186745 | 7/2007 |

* cited by examiner

ALUMINUM PLATED STEEL SHEET HAVING EXCELLENT CORROSION RESISTANCE WITH RESPECT TO ALCOHOL OR MIXED GASOLINE OF SAME AND APPEARANCE

This application is a national stage application of International Application No. PCT/JP2011/066627, filed Jul. 14, 2011, the content of which is incorporated by reference in its entirety.

TECHNICAL FIELD

The present invention relates to aluminum plated steel sheet having excellent corrosion resistance and appearance which does not rust even if used for tanks of fuel containing methanol, ethanol, or other alcohol or gasoline in which these alcohols are mixed etc. (below, in the present application, these being referred to all together as "flex fuels") and a method of production of the same.

BACKGROUND ART

In recent years, for automobile fuel, the ratio of introduction of methyl alcohol, ethyl alcohol, methyl-t-butyl ether, and other alcohols and gasoline in which these alcohols are mixed (flex fuels), so-called "gasohol", has been increasing as a general trend.

However, these flex fuels have the following defects:
(a) Water is easily contained
(b) Phase separation easily occurs due to an increase in the moisture content and a drop in temperature.
(c) Further, oxidation causes deterioration resulting in production of organic acids and easy phase separation. For example, methanol changes to formic acid and ethanol changes to acetic acid. As a result, phase separation into mainly alcohol and/or organic acid and water occurs, so there is much stronger corrosiveness compared with ordinary gasoline.

In general, as the material for automobile fuel tanks, Pb—Sn alloy plated steel sheet, called "terne-coated sheet", and zinc (Zn)-plated steel sheet treated with thick chromate has been used. However, Pb—Sn-alloy plated steel sheet and zinc-plated steel sheet are corroded by the moisture which is contained in alcohol, formaldehyde, acetoaldehyde, and other alcohol oxides, formic acid, acetic acid, or other impurities and elute plating ingredients into the fuel. For this reason, conventional plated steel sheet is not suited to a fuel tank for flex fuels.

Further, in recent years, art relating to hot dip aluminum coated steel sheet has been proposed. PLT 1 describes aluminum plated steel sheet for fuel tank use which has excellent corrosion resistance comprised of steel sheet on the surface of which an aluminum plating layer comprised of, by wt %, Mg: 0.5 to 15%, Si: 2 to 15%, and a balance of Al and unavoidable impurities is provided, the aluminum plating layer containing an $Mg_2Si$ phase.

PLT 2 describes hot dip aluminum coated steel sheet which has excellent corrosion resistance and appearance characterized by comprising steel sheet on the surface of which an aluminum plating layer comprised of, by wt %, Mg: 1 to 15%, Si: 2 to 15% and also an alkali earth metal element other than Mg in 0.02 to 5% is provided, the plating layer containing an $Mg_2Si$ phase.

PLT 3 proposes hot dip aluminum coated steel sheet comprised of steel sheet on the surface of which a metal structure which contains, by wt %, Mg: 3 to 10%, Si: 1 to 15%, and Ca: 0.01 to 2% and which has an $Mg_2Si$ phase with a long axis of 10 μm or less is provided.

Even if these plated steel sheets are used for fuel tanks for petroleum-derived gasoline or diesel oil, the inside surfaces of the tanks will not be corroded, so pitting will not occur. Further, no floating corrosion products are formed, so no filter clogging occurs in the fuel circulation system either. Furthermore, the outside surface of the tank is protected against salt corrosion by paint in addition to the plating layer, so again no pitting occurs.

However, if using flex fuels for automobile fuel, the fuel tanks will be corroded. That is, with aluminum plated steel sheet, the alcoholate reaction (see following formula) causes the aluminum plating to dissolve in the alcohol, so sufficient corrosion resistance is not exhibited against alcohol or mixed gasoline. Al—Mg—Si-based plated steel sheet is resistant to an alcoholate reaction, but if the alcohol concentration is high, again a sufficient corrosion resistance is not obtained:

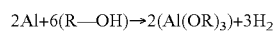

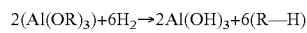

As art for solving these problems relating to alcohol and flex fuels, several arts have been proposed. PLT 4 describes steel sheet for a high corrosion resistance fuel tank for alcohol or flex fuels characterized by comprising steel sheet on the surface of which is provided an organic bonded solid lubricant film on which aluminum or an Al—Si alloy plating which contains Si: 3 to 12% is deposited to 30 to 400 $g/m^2$, which is treated by chromate to 10 to 40 $mg/m^2$ converted to chrome, and which contains metal powder over that.

PLT 5 describes steel sheet for fuel tank use comprised of steel sheet on the surface of which a zinc-based plating layer is provided, over which an organic film which is formed by a bisphenol type epoxy resin, phosphoric acid-modified epoxy resin, modified epoxy resin which has a primary hydroxyl group, a glycoluril resin and a metal compound is provided, the metal compound containing at least a V compound, the glycoluril resin being contained in 5 to 20 mass % with respect to the total solid content of the organic film, and the metal compound being contained in 10 to 20 mass %. However, these steel sheets for fuel tank use are coated on their surfaces after plating (surface treated). Plating along is not enough to improve the corrosion resistance to alcohol or flex fuels.

As explained above, plated steel sheet which has sufficient corrosion resistance with respect to alcohol or mixed gasoline of the same has not yet been commercialized.

CITATIONS LIST

Patent Literature

PLT 1: Japanese Patent Publication No. 2000-290763A
PLT 2: Japanese Patent Publication No. 2001-73108A
PLT 3: Japanese Patent Publication No. 2000-328168A
PLT 4: Japanese Patent Publication No. 6-306637A
PLT 5: Japanese Patent Publication No. 2007-186745A

SUMMARY OF INVENTION

Technical Problem

As explained above, the arts of PLT's 4 and 5 describe steel sheets which are coated (surface treated) after plating—not steel sheets without coatings which have sufficient corrosion resistance as plated steel sheet for flex fuels. The steel sheet described in PLT 3 was of an extent exhibiting relatively good corrosion resistance even to flex fuels. In general, flex fuels easily contain moisture. The steel materials of fuel tanks which contact them, in particular the vertical wall parts which are heavily press formed, are exposed to a corrosive environment. Therefore, steel materials for fuel tanks for flex fuels are required to have higher corrosion resistance than the past.

The plated steel sheet according to the present invention aims at giving a corrosion resistance and appearance against flex fuels equal to or better than steel sheet due to conventional coating. Specifically, in the evaluation of the corrosion resistance, it aims at prevention of excessive corrosion products, red rust, etc. in the later explained corrosion tests. Further, in appearance, it aims at no wrinkles being visually confirmable.

Solution to Problem

The inventors took note of the effect of suppression of corrosion due to flex fuels in the $Mg_2Si$ intermetallic compounds present in the aluminum plating layer and engaged in research to solve the above problems. As a result, they discovered that $Mg_2Si$ with a long axis of 10 μm or less inhibits an alcoholate reaction and improves the corrosion resistance against flex fuels.

Further, $Mg_2Si$ is a brittle intermetallic compound which easily breaks upon being press formed. In particular, an automobile fuel tank has a complicated shape, so when produced by press forming, sometimes the rate of reduction of thickness at the vertical wall parts reaches close to 20%. At this time, due to press forming, stress locally concentrates at the Al plating layer around $Mg_2Si$ which has a large aspect ratio, that is, an elongated shape. As a result, the inventors discovered that the Al plating layer cracked and the corrosion resistance deteriorated.

From the above, the inventors discovered that the $Mg_2Si$ particles should be as close to a spherical shape (aspect ratio=1) as possible and that the aspect ratio should be made 3 or less.

That is, they discovered that by making the long axis of the $Mg_2Si$ particles less than 10 μm and making the aspect ratio 3 or less and finely dispersing the particles, plated steel sheet which has excellent corrosion resistance to flex fuels is obtained and thereby completed the present invention.

The inventors also intensively studied the method of finely dispersing $Mg_2Si$ particles which have the above shape features in an aluminum plating layer. As a result, they discovered that to make the $Mg_2Si$ particles finely disperse and make them shapes close to spherical shapes, it is effective to add Ti in the plating metal and control the cooling method after plating so that the Ti—Al peritectic reaction is promoted.

Furthermore, the inventors discovered that to prevent the formation of MgO (oxide film) and deterioration of the plating appearance even when Mg does not form $Mg_2Si$ particles and remains in the aluminum plating layer, it is important to limit the amount of Mg and add a fine amount of Ca with a stronger oxidizing power than Mg and give priority to the formation of CaO. Due to this, they discovered a range of the plating composition which has excellent corrosion resistance with respect to flex fuels and which is excellent in appearance.

That is, by making the contents of Si and Mg and Ca in the Al—Mg—Si—Ca-based hot dip coating layer specific ranges by further by adding a suitable amount of Ti so as to make $Mg_2Si$ particles with a long axis of 10 μm or less and close to spherical shapes finely disperse in the plating layer, plated steel sheet which is excellent in both corrosion resistance and appearance with respect to flex fuels is obtained. Steel sheet which has this plating layer can be produced by an existing process, so is steel sheet with good flexibility in production. Furthermore, it is equal to ordinary steel sheet in workability, so fuel tanks can be produced while making use of conventional processes.

The present invention was made based on these discoveries and has as its gist the following:

(1) Aluminum plated steel sheet which is excellent in corrosion resistance and appearance which is comprised of steel sheet on at least one surface of which there is a plating layer comprised of, by mass %,
Si: 2% to 11%,
Mg: 3% to 9%,
Ca: 0.1% to 5%,
Ti: 0.005% to 0.05%, and
a balance of Al and unavoidable impurities,
the plating layer containing $Mg_2Si$ particles with a long axis of 10 μm or less and a ratio of a long axis and a short axis, that is, an aspect ratio, of 1 to 3.

(2) Aluminum plated steel sheet which is excellent in corrosion resistance and appearance as set forth in (1) characterized by having an Al—Si—Fe-based alloy layer of a thickness of 5 μm or less at the interface of the plating layer and the steel sheet.

(3) Aluminum plated steel sheet which is excellent in corrosion resistance and appearance as set forth in (1) or (2) characterized in that the plating layer has a thickness of 9 to 35 μm.

(4) A fuel tank which is excellent in corrosion resistance and appearance characterized by using aluminum plated steel sheet which has a plating layer comprised of, by mass %,
Si: 2% to 11%,
Mg: 3% to 9%,
Ca: 0.1% to 5%,
Ti: 0.005% to 0.05%, and
a balance of Al and unavoidable impurities,
the plating layer containing $Mg_2Si$ particles with a long axis of 10 μm or less and a ratio of a long axis and a short axis, that is, an aspect ratio, of 1 to 3.

(5) A method of production of aluminum plated steel sheet which is excellent in corrosion resistance and appearance characterized by dipping and running steel sheet in a hot dip aluminum coating bath comprised of, by mass %,
Si: 2% to 11%,
Mg: 3% to 9%,
Ca: 0.1% to 5%,
Ti: 0.005% to 0.05%, and
a balance of Al and unavoidable impurities and
having a temperature of 670° C. or more,
cooling in a first stage cooling process up to a temperature range of 600 to 640° C. by a cooling rate of 25° C./sec or more, then further cooling in a second stage cooling process up to a temperature range of 550 to 590° C. by a cooling rate of 16° C./sec or more.

Advantageous Effects of Invention

According to the present invention, it is possible to provide plate steel sheet which can handle methanol or ethanol or other alcohol alone or gasoline containing these alcohols or other flex fuel. The plated steel sheet according to the present invention has a corrosion resistance which can handle various fuels and is excellent in appearance. Further, the press formability, weldability, and coatability are no different from conventional aluminum plated steel sheet. There is no need to change the fuel tank production process. That is, the flexibility of production is high and existing processes can be utilized for production.

DESCRIPTION OF EMBODIMENTS

Figure 1:
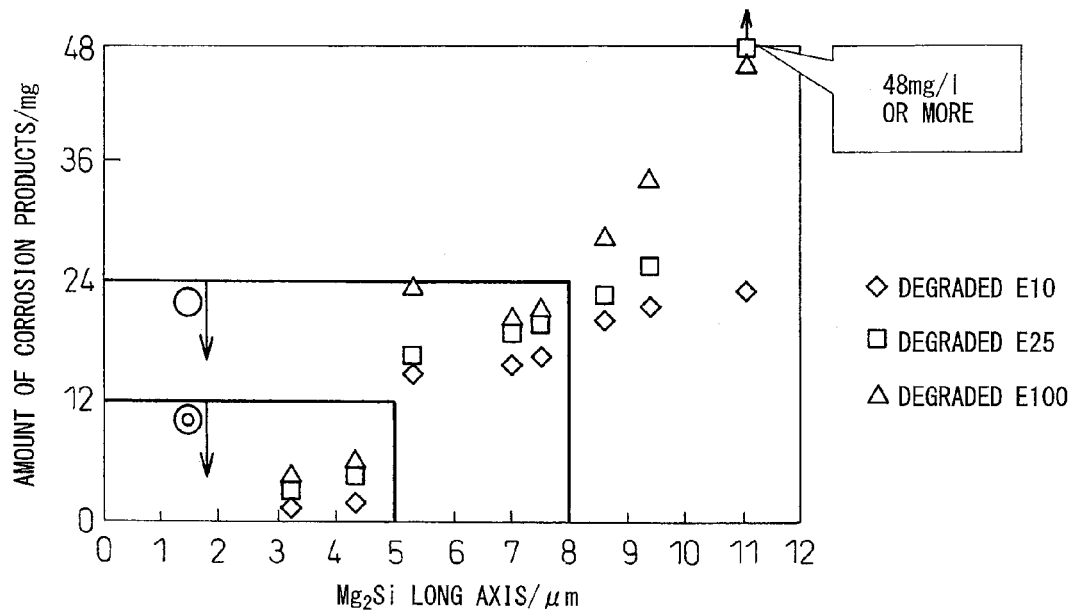
FIG. 1 is a view which shows the relationship of the long axis of $Mg_2Si$ which is contained in the plating layer of the present invention and the corrosion resistance with respect to alcohol-containing gasoline.
Figure 2:
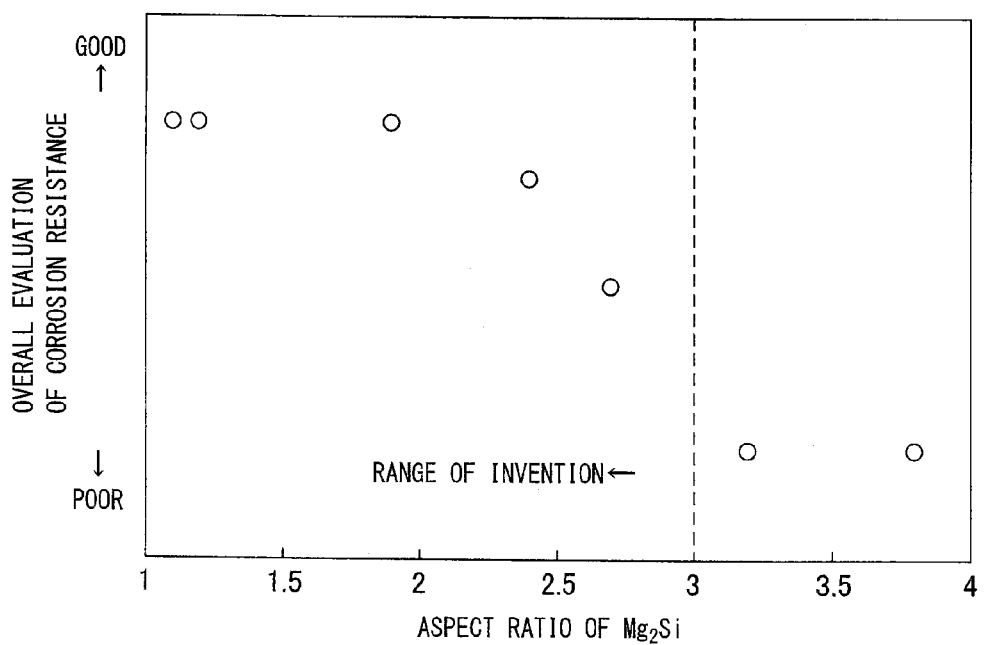
FIG. 2 is a view which shows the relationship of the aspect ratio of $Mg_2Si$ which is contained in the plating layer of the present invention and the corrosion resistance with respect to alcohol-containing gasoline.

Below, embodiments of the present invention will be explained. Note that, in the present invention, the steel sheet which forms the base material is not particularly limited. This is because the corrosion resistance and appearance are determined by the aluminum plating layer on the surface of the steel sheet. First, the reasons for numerical limitation of the ratios of the hot dip coating ingredients of the present invention will be explained. Here, the % in the ingredients mean mass %.

Si: 2 to 11%,

In the present invention, it is important to add Mg and Si in combination and make $Mg_2Si$ sufficiently precipitate in the plating layer. Si is an ingredient which is required for reacting with Mg to cause precipitation of $Mg_2Si$. To make $Mg_2Si$ precipitate enough to contribute to the improvement of the corrosion resistance with respect to flex fuels, the content of Si has to be 2% or more. From the viewpoint of obtaining a sufficient amount of precipitation of $Mg_2Si$, the lower limit of Si is preferably 4%, more preferably 6%.

On the other hand, to include Si in over 11%, the plating bath has to be raised in melting point. This is disadvantageous economically. If the Si further increases, the workability is degraded, so 11% was made the upper limit. From the viewpoint of the operating stability of the plating bath (prevention of shortening of life of equipment inside high temperature bath), the upper limit of Si is preferably 10%, more preferably 8%.

Mg: 3 to 9%

Mg is an ingredient which is necessary for reacting with Si to cause precipitation of $Mg_2Si$ in the plating layer. To make $Mg_2Si$ sufficiently precipitate to contribute to improvement of the corrosion resistance, the content of Mg has to be 3% or more. From the viewpoint of obtaining a sufficient amount of precipitation of $Mg_2Si$, the lower limit of Mg is preferably made 4%, more preferably 5%.

On the other hand, to include Mg in more than 9%, the melting point of the plating bath has to be raised. This is disadvantageous economically. Furthermore, if Mg increases, excessive Mg causes serious wrinkling due to the oxide film and degrades the plating appearance, so the upper limit was made 9%. From the viewpoint of making the appearance of the plating layer more beautiful, the upper limit of Mg is more preferably made 7%.

Ca: 0.1 to 5%,

Ca is stronger in oxidizing power than even Mg, so is added to suppress the formation of an Mg oxide film and improve the plating appearance. The content of Ca to obtain this effect depends on the content of Mg. If in the above range of content of Mg, 0.1% or more is necessary. From the viewpoint of appearance, the lower limit of Ca is preferably 0.12%, more preferably 0.15%.

On the other hand, if adding Ca in over 5%, the plating bath becomes higher in melting point and the plating rises in viscosity—which becomes disadvantageous economically, so the upper limit was made 5%. From the viewpoint of the stability of the operation, the upper limit of the concentration of Ca is preferably made 4.8%, more preferably 4.2%.

Ti: 0.005 to 0.05%

Ti causes a peritectic reaction of L (liquid phase ("L" means liquid phase metal))+$TiAl_3$→(Al) at 665° C. $TiAl_3$ forms the nuclei for formation of $Mg_2Si$ in the process of solidification of the plating layer, so if making the $TiAl_3$ finely disperse, $Mg_2Si$ also finely disperses. Further, since $TiAl_3$ becomes nuclei for formation of $Mg_2Si$, the $Mg_2Si$ which easily grows into a plate shape easily becomes particles. To make the $TiAl_3$ finely disperse in a plating bath of 665° C. or more, the Ti content has to be 0.005% or more. From the viewpoint of securing fine dispersion of $Mg_2Si$, the lower limit is preferably made 0.008%, more preferably 0.01%.

On the other hand, if adding Ti in 0.05% or more, the liquidus temperature of the Al—Si—Mg—Ca alloy is raised, so this is not preferable. Further, the reduction of dross by oxidation of Ti and other aspects of operational stability are also impaired. If considering the stability in operation, the upper limit of the Ti content is preferably 0.02%, more preferably 0.018%.

[Si Mass %]≥0.6×[Mg Mass %]

To prevent Mg from remaining in the Al plating layer alone and make it $Mg_2Si$ to suppress an alcoholate reaction, it is preferable to make [Si mass %]≥0.6×[Mg mass %]. $Mg_2Si$ suppresses the first stage reaction in the alcoholate reaction which is shown by the following formulas. Due to this, dissolution of the main ingredient Al in the plating is inhibited and the role of sacrificial corrosion prevention is performed.

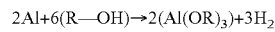

$$2Al + 6(R-OH) \rightarrow 2(Al(OR)_3) + 3H_2$$

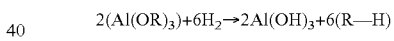

$$2(Al(OR)_3) + 6H_2 \rightarrow 2Al(OH)_3 + 6(R-H)$$

Further, if [Si mass %] becomes less than 0.6×[Mg mass %], Mg remains, so there is no effect of addition of Ca and the plating appearance is degraded.

0.6×[Mg Mass %]≥[Ca Mass %]≥0.03×[Mg Mass %]

Ca is an element which suppresses the oxidation of the remaining Mg. Ca suppresses the formation of MgO, which causes wrinkles, and improves the plating appearance. If [Ca mass %] becomes less than 0.03×[Mg mass %], the effect of suppression is not sufficiently obtained. This is because the remaining Mg oxidizes and forms an oxide film which becomes the cause of wrinkling. On the other hand, if [Ca mass %] exceeds 0.6×[Mg mass %], the plating melting point becomes higher, which is not economical, and the effect of improvement of the plating appearance becomes saturated. Therefore, the range of content of Ca is preferably made the range of the following formula:

$$0.6 \times [\text{Mg mass \%}] \geq [\text{Ca mass \%}] \geq 0.03 \times [\text{Mg mass \%}]$$

Long Axis of $Mg_2Si$ of 10 μm or Less

An $Mg_2Si$ intermetallic compound is hard and brittle. For this reason, if there is an intermetallic compound with a large long axis present, the plating layer itself remarkably falls in workability. For this reason, cracks occur in the press forming of steel sheet and corrosion easily occurs at the cracked parts. The inventors ran a draw bead test (sheet thickness reduction rate 20%) on plated steel sheet different in the long axis of $Mg_2Si$ while envisioning press forming of a fuel tank and discovered that if the long axis of the $Mg_2Si$ exceeds 10 μm, cracks easily occur. Therefore, the long axis of the $Mg_2Si$ which causes precipitation dispersed in the plating layer was made 10 μm or less.

If making the long axis of $Mg_2Si$ even finer, a larger amount of the $Mg_2Si$ finely disperses, the plating layer becomes more uniform in structure, and the corrosion resistance is further improved. Further, even if the plating layer corrodes, the corrosion products do not become coarser and clogging of the filter of the fuel circulation system is remarkably reduced. For this reason, the upper limit of the long axis of $Mg_2Si$ is preferably made 8 μm or less, more preferably 6 μm or less, if possible 5 μm or less. FIG. 1 shows the relationship between the long axis of $Mg_2Si$ and the indicator of the corrosion resistance constituted by the amount of corrosion products. It is learned that if the long axis of $Mg_2Si$ becomes larger, the corrosion products increase (that is, the corrosion resistance deteriorates).

On the other hand, the lower limit of $Mg_2Si$ is not particularly limited. However, if too small, the specific surface area becomes larger, the dissolution speed of $Mg_2Si$ becomes larger, and the lifetime becomes shorter. Further, to make the $Mg_2Si$ size smaller, the cooling rate after plating has to be remarkably raised. This is also disadvantageous economically. From this, as the lower limit of the long axis of $Mg_2Si$, it is preferable to secure 1 μm or more. The lower limit of the long axis of $Mg_2Si$ is preferably 1.5 μm, if possible 2 μm or more.

Aspect Ratio of $Mg_2Si$: 1 to 3

As explained above, $Mg_2Si$ is hard and brittle, so easily forms starting points of crack propagation at the time of press forming. In particular, if there are pin-shaped particles two-dimensionally (planarly) with a long axis longer than the short axis, they induce cracks in the plating layer and cause deterioration of the corrosion resistance. For this reason, a smaller aspect ratio (ratio of long axis and short axis of $Mg_2Si$ particles (long axis/short axis)) is preferable. Ideally, the particles are spherical in shape and the aspect ratio is 1. This is the lower limit. To prevent any detrimental effect from being recognized in the corrosion resistance, from the experiments of the inventors, 3 is made the upper limit of the aspect ratio. Of course, the smaller the aspect ratio, the better. Making it 2.4 or less is preferable.

Ordinary $Mg_2Si$ intermetallic compounds are elliptically shaped plates (pieces) under ordinary solidification conditions (cooling by standing). To make the $Mg_2Si$ intermetallic compounds ones with small aspect ratios, that is, as close to spherical shapes as possible, it is necessary to control the cooling conditions. For this reason, the inventors discovered that to prevent the $Mg_2Si$ particles from becoming coarser, it is possible to rapidly cool the sheet to a certain extent so as to cool it while the particles are fine and make the aspect ratio small. The cooling conditions will be explained later.

The long axis and aspect ratio of the $Mg_2Si$ particles can be found by examining the cross-section of the plating layer by an EPMA. The EPMA is used to examine the Al—Mg—Si—Ca-based plating layer, the clumps of precipitates including Mg and Si in the plating layer are judged to be $Mg_2Si$, and the precipitates are measured for their long axis and short axis. The aspect ratio is found by dividing the long axis by the short axis.

Next, the method of making $Mg_2Si$ particles with a long axis of 10 μm or less and an aspect ratio of 1 to 3 disperse and precipitate in the plating layer in large numbers will be explained. To make $Mg_2Si$ with a long axis of 10 μm or less and an aspect ratio of 1 to 3 disperse in the plating layer in large numbers, as explained in the section on Ti, it is important to make $TiAl_3$ finely disperse in the liquid phase in the process of solidification of the plating.

The reason is that $TiAl_3$ forms nuclei for formation of $Mg_2Si$ and, as a result, $Mg_2Si$ can be made to finely disperse uniformly in the plating layer. For this reason, the method of production of the plated steel sheet according to the present invention is characterized by two stages of cooling for precipitation of $TiAl_3$ after hot dip coating and precipitation of $Mg_2Al$ after that.

First, the hot dip aluminum coating process will be explained. The temperature of the plating bath, which has the same composition of ingredients as the plating layer, should be 670° C. or more. Therefore, the steel sheet is dipped and passed through the bath in the same way as an ordinary hot dip aluminum coating process to plate aluminum.

The plating bath temperature is more preferably given a lower limit of 680° C. from the viewpoint of securing a margin from the peritectic reaction temperature (665° C.). Furthermore, 685° C. is more preferable. Further, if the plating bath temperature becomes too high, the sheet will be rapidly cooled before the $TiAl_3$ precipitates after plating and the lifetime of the various equipment inside the bath will become shorter, so the upper limit should be made 700° C. or so. Making it 695° C. is more preferable. If possible, making it 690° C. is still more preferable. The temperature of the steel sheet at the time of entering the plating bath should be made slightly higher than the plating bath temperature (plating bath temperature to plating bath temperature+30° C. or so). More preferably, it is desirably made 5 to 15° C. higher than the plating bath temperature.

Next, the aluminum plated steel sheet is cooled in the first stage of the cooling process. The first stage of the cooling process cools the hot dip coated steel sheet all at once down to the peritectic reaction temperature of L (liquid phase)+$TiAl_3$→(Al) (665° C.) to 620° C. by a 25° C./sec or faster cooling rate. At this time, the plating layer has $TiAl_3$ remaining in it due to the overcooling. The target temperature of the first stage of cooling is 620° C., but in the actual process, it is sufficient to cool down to 600 to 640° C. in range of temperature.

After that, as the second stage of cooling, the plated steel sheet is cooled down to 570° C. by a cooling rate of 16° C./sec or more to make $Mg_2Si$ precipitate and grow. At this time, the larger the cooling rate, the smaller the aspect ratio of the $Mg_2Si$ particles tends to become. The target temperature of the second stage of cooling is 570° C., but in the actual process, it is sufficient to cool down to a temperature of 550 to 590° C. in range.

Note that, the hot dip aluminum coating process, first stage cooling process, and second stage cooling process are preferably consecutive. This is to maintain the cooling rate in the process of solidification of the plating layer in the above range.

The first stage of cooling, that is, the cooling when passing the peritectic reaction temperature (665° C.), is necessary in order for the $TiAl_3$ to finely disperse in the plating layer. At this time, the greater the cooling rate, the more the $TiAl_3$ is finely dispersed, so the $Mg_2Si$ is also finely dispersed and precipitates. That is, it is important that the cooling rate from the temperature of the hot dip coating metal (670° C. or more) to 620° C. be 25° C./sec or more.

This is because if the cooling rate during this time is 19° C./sec or so, the aspect ratio of the $Mg_2Si$ particles sometimes becomes 3 or less, but if made 25° C./sec or more, the aspect ratio of the $Mg_2Si$ particles reliably becomes 3 or less.

The upper limit of the cooling rate need not be particularly set, but if the cooling rate becomes too large, for example, in the case of a jet cooler, the increase in the flow rate may cause patterns. In the case of mist cooling as well, similar patterns may form. Further, while inefficient economically as well, 35° C./sec or 40° C./sec or so may also be made the upper limit.

The second stage cooling, that is, the cooling from when the plating metal is in the overcooling state (620° C.) to complete solidification (570° C.), is necessary for the $Mg_2Si$ to precipitate and grow. At this time, if the cooling rate is too slow, the $Mg_2Si$ grows, the particle size becomes larger, and the aspect ratio becomes greater. For this reason, it was learned that the cooling rate during this should be made 16° C./sec or more. Preferably, it is made 18° C./sec or more, if possible, it is made 20° C./sec or more.

On the other hand, if the cooling rate is too fast, the particles become finer, the aspect ratio becomes smaller, and the $Mg_2Si$ sometimes does not sufficiently precipitate. However, the $Mg_2Si$ starts to precipitate after precipitation of $TiAl_3$, so no upper limit need particularly be provided. If forced to say something, the first stage cooling rate should be made the upper limit.

Further, the plated steel sheet according to the present invention is produced by running steel sheet in the hot dip coating bath in a similar ray to normal hot dip coated steel sheet, so inevitably, an alloy layer comprised of intermetallic compounds is formed between the plating layer and base iron. At this time, the composition of the alloy layer becomes Al—Si—Fe. If the amounts of addition of Mg and Ca increase, sometimes formation of intermetallic compounds in which these elements are included is observed.

The thickness of the alloy layer is preferably 5 μm or less. The reason is that the alloy layer is hard and brittle, so if thick, the workability of the steel sheet is greatly impaired. Further, if the alloy layer is thick, cracks first occur in the alloy layer at the press forming etc. These are propagated through the plating layer. As a result, there is a possibility of causing the corrosion resistance to deteriorate.

If the time of dipping in the plating bath is long, a thick alloy layer is formed. Therefore, it is necessary to adjust the time of dipping in the plating bath. Further, it is known that by adding Mg in the plating bath, the effect of reduction of the thickness of the alloy layer is also obtained.

Note that, the Fe from the steel sheet enters the plating bath, so Fe unavoidably enters the plating layer. Further, the plating layer sometimes also includes Cu, Ni, Mn, etc. However, even if Fe, Cu, Ni, and Mn are included in a total of 2 mass % or less, the characteristics of the steel sheet according to the present invention are not affected.

In hot dip coating, the wiping for controlling the amount of plating deposition is most generally gas wiping. The type of the wiping gas is usually $N_2$, air, etc., but in addition, $CO_2$, combustion gas, etc. may be used. The concentration of oxygen on the bath surface may also be controlled.

If the amount of plating deposition increases, in general the corrosion resistance is improved. Conversely, the workability and weldability fall. The present invention enables this effect to be obtained even with a little amount of deposition since the plating composition is excellent in corrosion resistance. The amount of plating deposition (total amount of deposition of plating layer and alloy layer of intermetallic compound) preferably is a thickness of 9 to 35 μm (25 to 100 g/m² per side). If the amount of plating deposition is less than 9 μm per side (25 g/m²), the corrosion resistance becomes insufficient. If the amount of plating deposition exceeds 35 μm (100 g/m²), the corrosion resistance becomes saturated and further the press formability, plating adhesion, and resistance weldability become poor. From the viewpoint of the corrosion resistance, the lower limit of the amount of deposition is more preferably 10.5 μm (30 g/m²), still more preferably 12.3 μm (35 g/m²).

The composition of the plated sheet which is used in the present invention is not particularly limited. For applications where a high degree of workability is demanded, use of IF steel excellent in workability is desired. Further, to secure air-tightness after the welding and secondary workability, steel sheet to which several ppm of B is added is preferable. Conversely, for applications where strength is demanded, low carbon steel, high tension steel, etc. naturally may be used.

In the present invention, the post-treatment of the plated steel sheet is not particularly limited. Of course, the sheet may also have a post-treatment film aimed at improvement of the workability. For example, chromate-free chemical conversion using Zr, V, $Cr^{3+}$, etc. and resin coating are also possible. For the chemical conversion, phosphoric acid, silica, etc. may be used.

Further, an Mg-based compound may be added. As the type of resin, for example, there are an acrylic acid or methacrylic acid ester, vinyl carboxylic acid ester, vinylether, styrene, acrylamide, acrylonitrile, halogenated vinyl, or other ethylenic unsaturated compound and epoxy, urethane, polyester, etc.

Furthermore, in addition to chemical conversion and resin coating, treatment for making the appearance uniform after hot dip coating such as zero spangle treatment, treatment for modifying the plating such as annealing, temper rolling for adjusting the surface conditions and properties, etc. may be applied.

To make the steel sheet and plating bath uniformly react and obtain a stable appearance, pretreatment such as preplating, washing, etc. may be applied before hot dip coating. For example, preplating by Ni, Co, Sn, and Zn may be considered.

Next, a fuel tank which uses the plated steel sheet according to the present invention will be explained.

The fuel tank of the present invention is not particularly limited in application. It may be used in automobiles, motorcycles, buses, trucks, etc. Furthermore, the method of working the plated steel sheet according to the present invention is also not particularly limited. This is because the sheet has workability equivalent to conventional plated steel sheet. As a result, the fuel tank according to the present invention is also not particularly limited in shape.

Summarizing the above, the fuel tank according to the present invention can be produced by an existing design technique while using an existing production process. However, only naturally, in the case of plated steel sheet which is plated on only one surface, the plated surface has to be made the surface which contacts the flex fuels.

The plated steel sheet according to the present invention itself has excellent corrosion resistance to flex fuels, so fuel tanks which use the same also have excellent corrosion resistance.

EXAMPLES

Below, examples of the present invention will be explained. Cold rolled steel sheet (sheet thickness 0.8 mm) was used as the base material for hot dip aluminum coating. The composition of the plating bath was based on Al and was changed in the amounts of Si, Mg, Ca, and Ti in various ways. In addition to these, as an impurity element, the Fe which enters from the steel sheet etc. was contained in an amount of 1 to 2% or so (mass %).

The sheet temperature of the steel sheet when entering the plating bath and the bath temperature were both made 670° C.

The time of dipping in the bath was changed to control the thickness of the alloy layer. The amount of plating deposition was adjusted after plating by $N_2$ gas wiping. The cooling was controlled from 670° C. to 620° C. (first stage cooling) and from 620° C. to 570° C. (second stage cooling). The thus produced samples were checked for plating composition, long axis (μm) and aspect ratio of $Mg_2Si$, thickness of alloy layer, and plating thickness.

The plating layer was evaluated by peeling off only the plating layer and evaluating it in accordance with the test methods of properties of plating layers which are described with reference to JIS H 8672. That is, the aluminum coating layer was electrolytically peeled off in a 241 g/l solution of $AlCl_3.6H_2O$. The peeled off area at this time was 25 $cm^2$, and the current density was 20 $mA/cm^2$. When reaching the potential which shows the alloy layer, the current was immediately stopped, the alloy layer was exposed, and the solution of the dissolved plating layer was quantitatively analyzed by ICP (inductively coupled plasma). The thickness of the alloy layer was measured by a 400× cross-section micrograph.

Further, the hot dip coated steel sheet was evaluated for appearance, corrosion resistance, and overall condition by the methods explained below. The results are shown in Tables 1 to 4. (Note that, Table 1-1 and Table 1-2 will together be called Table 1.)

Evaluation of Appearance
E (Excellent): Visibly beautiful with no wrinkles
F (Fair): Visible slight wrinkles
P (Poor): Visible wrinkles Corrosion Resistance Using an Erichsen testing machine, diameter 50 mm, depth 40 mm, flat bottom cupped samples were used to seal in the following three types (Degraded E10, Degraded E25, and Degraded E100) of ethanol-mixed gasoline 40 ml at 45° C. for 1500 hours and examined for appearance.

A sample with corrosion products was washed by ultrasonically waves while sealing in fuel. The corrosion products deposited on the sample and the corrosion products floating free in the fuel were filtered using a 0.8 μm mesh membrane filter.

A membrane filter on which corrosion products were trapped was used to further filter normal heptane 100 ml, then the membrane filter was dried at 80° C. for 1 hour and the dry weight of the corrosion products was measured.

Degraded E10 is a mixed solution of 99.5 vol % of a mixed gasoline containing 10 vol % of ethanol and 0.5 vol % of corrosive water (to which acetic acid 100 ppm and chlorine 100 ppm are added)

Degraded E25 is a mixed solution of 98 vol % of a mixed gasoline containing 25 vol % of ethanol and 2 vol % of corrosive water (to which acetic acid 100 ppm and chlorine 100 ppm are added)

Degraded E100 is a mixed solution of 93 vol % of ethanol and 7 vol % of corrosive water (to which acetic acid 100 ppm and chlorine 100 ppm are added)

Evaluation of Corrosion Resistance
E (Excellent): No change in appearance and less than 12 mg/liter of corrosion products
G (Good): No change in appearance and less than 24 mg/liter of corrosion products
F (Fair): White rust present and 24 mg/liter or more of corrosion products
P (Poor): Red rust and white rust confirmed Overall Evaluation
E (Excellent): No problem in appearance and corrosion resistance
G (Good): Usable level
F (Fair): Usable level, some problem in corrosion resistance or appearance
P (Poor): Problem in appearance or corrosion resistance—unusable level Table 1 shows the results of study of the chemical composition of the plating layer. Comparative Example No. 1 had a low amount of Mg outside of the present invention, so red rust and white rust were confirmed and the corrosion resistance was inferior.

Comparative Example No. 9 had a high amount of Mg outside of the present invention, so the appearance was inferior.

Comparative Example No. 10 had a low amount of Si outside of the present invention, so the amount of formation of $Mg_2Si$ was insufficient and the corrosion resistance was inferior. Conversely, Comparative Example No. 20 had a high amount of Si outside of the present invention, so the plating bath was too high in melting point and the plating bath could not be prepared.

Comparative Example No. 21 had a low amount of Ca outside of the present invention, so wrinkles occurred and the appearance was inferior. As the amount of Ca became greater as in Nos. 22 and 23, wrinkling was suppressed. With the amount of Ca of No. 24, a beautiful appearance was obtained. However, if the amount of Ca became further greater as in No. 31 to No. 34, the plating bath became viscous and operation became difficult. Comparative Example No. 35 had a high amount of Ca outside of the present invention, so the makeup of the bath became difficult and a sample which could be evaluated could not be prepared.

No. 36 to No. 46 changed the amount of Ti. The tendency was recognized that as the amount of Ti increases, the $Mg_2Si$ becomes smaller in long axis and the $Mg_2Si$ becomes smaller in aspect ratio (that is, becomes close to spherical).

Comparative Example No. 36 had no Ti added, while Comparative Example No. 37 had an insufficient amount of Ti. The corrosion resistance was inferior. On the other hand, when the amount of Ti is over 0.02%, the liquidus temperature of the Al—Si—Mg—Ca alloy is raised, so this is not preferable. Further, the reduction of dross by oxidation of Ti and other aspects of operational stability are also impaired. Comparative Example No. 46 had too great a Ti. The makeup of the bath became difficult and a sample which could be evaluated could not be prepared.

As opposed to this, the invention examples were all excellent in appearance and corrosion resistance. The overall evaluations were also excellent.

Next, the inventors took the plating composition of Invention Example No. 5 and changed the first and second cooling rates after hot dip coating. The results are shown in Table 2. In No. 47 to No. 53, the first stage cooling rate was changed. If the first stage cooling rate increases, a tendency is observed of the $Mg_2Si$ becoming smaller in aspect ratio (that is, becoming closer to a sphere).

In Comparative Example No. 47 and Comparative Example No. 48, the first stage cooling rate was insufficient, the rate was insufficient for fine dispersion and precipitation of $Mg_2Si$, and the aspect ratio could not be controlled to 3 or less. Note that like in No. 53, if making the cooling rate over 30° C./sec, a pattern is formed due to the increase in flow rate of the jet cooler. This is also inefficient economically.

In No. 54 to No. 62, the second stage cooling rate was changed. If the second stage cooling rate increases, a tendency is observed of the $Mg_2Si$ becoming smaller in long axis.

In Comparative Example No. 54, the second stage cooling rate is insufficient, so the $Mg_2Si$ becomes larger in long axis and the corrosion resistance becomes insufficient. On the other hand, if making the cooling rate excessive such as in No. 61 and No. 62, the $Mg_2Si$ becomes smaller in long axis and the amount of precipitation becomes insufficient, so a sufficient corrosion resistance becomes hard to obtain.

Next, the test results on the effects of the thickness of the alloy layer are shown in Table 3. The inventors took the plating composition of Invention Example No. 5 and changed the time for dipping in the hot dip coating bath and the thickness of the alloy layer for evaluation. The results are shown in Table 3.

Invention Example No. 62 to No. 66 were obtained by a 670° C.×2 second bath dipping time and gave a 2 to 5 μm alloy layer thickness. The appearance and corrosion resistance were excellent and the overall evaluation was excellent.

Invention Example No. 67 was obtained by a 620° C.×4 second bath dipping time and gave a 6.0 μm alloy layer thickness. It had visible slight wrinkles in appearance, white rust in the corrosion resistance test with Degraded E100, corrosion products of 24 mg/1 or more, and somewhat poor E100 corrosion resistance, but was evaluated overall as being usable.

No. 68 was obtained by a 620° C.×6 second bath dipping time and gave a 7.0 μm alloy layer thickness. It had visible slight wrinkles in appearance, white rust in the corrosion resistance test with Degraded E25 and Degraded E100, corrosion products of 24 mg/1 or more, and poor E100 corrosion resistance.

It is believed that as the alloy layer thickness becomes greater, the uneven thickness of the alloy layer caused fine wrinkles in the surface most plating layer. Further, a thick alloy layer is poor in workability. Cracks occurred which propagated to the plating layer in the process of cupping.

From the above test results, it was confirmed that when the thickness of the alloy layer is over 5 μm, use is possible, but the appearance becomes poor and the workability falls.

Next, the effects of the plating thickness will be evaluated. The inventors took the plating composition of Invention Example No. 5 and changed the wiping after hot dip coating to run a test on the effects of the plating thickness. The results are shown in Table 4.

As shown in Invention Example Nos. 69 to 71 of Table 4, when the plating thickness is less than 12.3 μm (amount of plating deposition per side of 35 $g/m^2$), the corrosion resistance becomes poorer. Conversely, as shown in Comparative Example No. 82 to No. 84, when plating thickness is more than 35 μm (amount of plating deposition per side of 100 $g/m^2$), not only is the result uneconomical, but also the separately evaluated press formability, plating adhesion (plating internal breakage), and resistance weldability fall.

From the above test results, the plating thickness does not have much an effect on the corrosion resistance or appearance. If in the above-mentioned range, it was confirmed that hot dip coated steel sheet which has excellent appearance and corrosion resistance can be obtained.

Above, the present invention will be explained by examples. Note that, the embodiments of the present invention are not limited to these examples.

TABLE 1-1

| No | Plating composition mass % | | | | 1st cooling °C./s | 2nd cooling °C./s | $Mg_2Si$ long axis μm | $Mg_2Si$ aspect ratio | Alloy layer thickness μm | Plating thickness μm | Appearance | Corrosion resistance | | | Overall evaluation | Remarks |
|---|---|---|---|---|---|---|---|---|---|---|---|---|---|---|---|---|
|  | Mg | Si | Ca | Ti |  |  |  |  |  |  |  | Degraded E10 | Degraded E25 | Degraded E100 |  |  |
| 1 | 2 | 8 | 0.2 | 0.015 | 28 | 26 | 6 | 1.2 | 3 | 15 | E | F | F | P | P | Comparative example |
| 2 | 3 | 8 | 0.2 | 0.015 | 28 | 26 | 6 | 1.2 | 3 | 15 | E | E | G | F | E |  |
| 3 | 4 | 8 | 0.2 | 0.015 | 28 | 26 | 6 | 1.2 | 3 | 15 | E | E | E | F | E |  |
| 4 | 5 | 8 | 0.2 | 0.015 | 28 | 26 | 6 | 1.2 | 3 | 15 | E | E | E | E | E |  |
| 5 | 6 | 8 | 0.2 | 0.015 | 28 | 26 | 6 | 1.2 | 3 | 15 | E | E | E | E | E |  |
| 6 | 7 | 8 | 0.2 | 0.015 | 28 | 26 | 6 | 1.2 | 3 | 15 | E | E | E | E | E |  |
| 7 | 8 | 8 | 0.2 | 0.015 | 28 | 26 | 6 | 1.2 | 3 | 15 | F | E | E | E | E |  |
| 8 | 9 | 8 | 0.2 | 0.015 | 28 | 26 | 6 | 1.2 | 3 | 15 | F | E | E | E | F |  |
| 9 | 10 | 8 | 0.2 | 0.015 | 28 | 26 | 6 | 1.2 | 3 | 15 | P | E | E | E | P | Comparative example |
| 10 | 6 | 1 | 0.2 | 0.015 | 28 | 26 | 6 | 1.2 | 3 | 15 | E | F | F | P | P | Comparative example |
| 11 | 6 | 2 | 0.2 | 0.015 | 28 | 26 | 6 | 1.2 | 3 | 15 | E | E | E | E | F |  |
| 12 | 6 | 3 | 0.2 | 0.015 | 28 | 26 | 6 | 1.2 | 3 | 15 | E | G | G | F | F |  |
| 13 | 6 | 4 | 0.2 | 0.015 | 28 | 26 | 6 | 1.2 | 3 | 15 | E | E | G | G | G |  |
| 14 | 6 | 5 | 0.2 | 0.015 | 28 | 26 | 6 | 1.2 | 3 | 15 | E | E | E | G | G |  |
| 15 | 6 | 6 | 0.2 | 0.015 | 28 | 26 | 6 | 1.2 | 3 | 15 | E | E | E | E | E |  |
| 16 | 6 | 7 | 0.2 | 0.015 | 28 | 26 | 6 | 1.2 | 3 | 15 | E | E | E | E | E |  |
| 17 | 6 | 9 | 0.2 | 0.015 | 28 | 26 | 6 | 1.2 | 3 | 15 | E | E | E | E | E |  |
| 18 | 6 | 10 | 0.2 | 0.015 | 28 | 26 | 6 | 1.2 | 3 | 15 | E | E | E | E | E |  |
| 19 | 6 | 11 | 0.2 | 0.015 | 28 | 26 | 6 | 1.2 | 3 | 15 | E | E | E | E | E |  |
| 20 | 6 | 12 | 0.2 | 0.015 | — | — | — | — | — | — | — | — | — | — | — | Comp. ex., bath makeup difficult |
| 21 | 6 | 8 | 0.08 | 0.015 | 28 | 26 | 6 | 1.2 | 3 | 15 | P | E | E | E | P | Comparative example |
| 22 | 6 | 8 | 0.1 | 0.015 | 28 | 26 | 6 | 1.2 | 3 | 15 | F | E | E | E | F |  |
| 23 | 6 | 8 | 0.12 | 0.015 | 28 | 26 | 6 | 1.2 | 3 | 15 | F | E | E | E | F |  |
| 24 | 6 | 8 | 0.15 | 0.015 | 28 | 26 | 6 | 1.2 | 3 | 15 | E | E | E | E | E |  |
| 25 | 6 | 8 | 0.3 | 0.015 | 28 | 26 | 6 | 1.2 | 3 | 15 | E | E | E | E | E |  |

TABLE 1-2

| No | Plating composition mass % | | | | 1st cooling °C./s | 2nd cooling °C./s | Mg$_2$Si long axis μm | Mg$_2$Si aspect ratio | Alloy layer thickness μm | Plating thickness μm | Appearance | Corrosion resistance | | | Overall evaluation | Remarks |
|---|---|---|---|---|---|---|---|---|---|---|---|---|---|---|---|---|
| | Mg | Si | Ca | Ti | | | | | | | | Degraded E10 | Degraded E25 | Degraded E100 | | |
| 29 | 6 | 8 | 3 | 0.015 | 28 | 26 | 6 | 1.2 | 3 | 15 | E | E | E | E | E | |
| 30 | 6 | 8 | 4 | 0.015 | 28 | 26 | 6 | 1.2 | 3 | 15 | E | E | E | E | E | |
| 31 | 6 | 8 | 4.2 | 0.015 | 28 | 26 | 6 | 1.2 | 3 | 15 | E | E | E | E | E | Operation difficult |
| 32 | 6 | 8 | 4.5 | 0.015 | 28 | 26 | 6 | 1.2 | 3 | 15 | E | E | E | E | E | Operation difficult |
| 33 | 6 | 8 | 4.8 | 0.015 | 28 | 26 | 6 | 1.2 | 3 | 15 | E | E | E | E | E | Operation difficult |
| 34 | 6 | 8 | 5 | 0.015 | 28 | 26 | 6 | 1.2 | 3 | 15 | E | E | E | E | E | Operation difficult |
| 35 | 6 | 8 | 5.5 | 0.015 | — | — | — | — | — | — | — | — | — | — | — | Comp. ex., bath makeup difficult |
| 36 | 6 | 8 | 0.2 | 0 | 28 | 26 | 10 | 6.3 | 3 | 15 | E | E | F | P | P | |
| 37 | 6 | 8 | 0.2 | 0.003 | 28 | 26 | 8 | 3.2 | 3 | 15 | E | E | F | P | P | Comparative example |
| 38 | 6 | 8 | 0.2 | 0.005 | 28 | 26 | 8 | 2.8 | 3 | 15 | E | E | E | F | G | |
| 39 | 6 | 8 | 0.2 | 0.008 | 28 | 26 | 6 | 2.5 | 3 | 15 | E | E | E | E | E | |
| 40 | 6 | 8 | 0.2 | 0.01 | 28 | 26 | 6 | 2.1 | 3 | 15 | E | E | E | E | E | |
| 41 | 6 | 8 | 0.2 | 0.018 | 28 | 26 | 5 | 1.2 | 3 | 15 | E | E | E | E | E | |
| 42 | 6 | 8 | 0.2 | 0.02 | 28 | 26 | 4 | 1.1 | 3 | 15 | E | E | E | E | E | Operation difficult |
| 43 | 6 | 8 | 0.2 | 0.03 | 28 | 26 | 4 | 1.1 | 3 | 15 | E | E | E | E | E | Operation difficult |
| 44 | 6 | 8 | 0.2 | 0.04 | 28 | 26 | 4 | 1.1 | 3 | 15 | E | E | E | E | E | Operation difficult |
| 45 | 6 | 8 | 0.2 | 0.048 | 28 | 26 | 4 | 1.1 | 3 | 15 | E | E | E | E | E | Operation difficult |
| 46 | 6 | 8 | 0.2 | 0.052 | — | — | — | — | — | — | — | — | — | — | — | Comp. ex., bath makeup difficult |

TABLE 2

| No | Plating composition mass % | | | | 1st cooling °C./s | 2nd cooling °C./s | Mg$_2$Si long axis μm | Mg$_2$Si aspect ratio | Alloy layer thickness μm | Plating thickness μm | Appearance | Corrosion resistance | | | Overall evaluation | Remarks |
|---|---|---|---|---|---|---|---|---|---|---|---|---|---|---|---|---|
| | Mg | Si | Ca | Ti | | | | | | | | Degraded E10 | Degraded E25 | Degraded E100 | | |
| 47 | 6 | 8 | 0.2 | 0.015 | 15 | 26 | 6 | 3.8 | 3 | 15 | E | E | P | P | P | Comparative example |
| 48 | 6 | 8 | 0.2 | 0.015 | 16 | 26 | 6 | 3.2 | 3 | 15 | E | G | F | P | P | Comparative example |
| 49 | 6 | 8 | 0.2 | 0.015 | 19 | 26 | 6 | 2.7 | 3 | 15 | E | E | G | F | F | |
| 50 | 6 | 8 | 0.2 | 0.015 | 22 | 26 | 6 | 2.4 | 3 | 15 | E | E | E | G | G | |
| 51 | 6 | 8 | 0.2 | 0.015 | 25 | 26 | 6 | 1.9 | 3 | 15 | E | E | E | E | E | |
| 52 | 6 | 8 | 0.2 | 0.015 | 28 | 26 | 6 | 1.2 | 3 | 15 | E | E | E | E | E | |
| 53 | 6 | 8 | 0.2 | 0.015 | 31 | 26 | 6 | 1.1 | 3 | 15 | F | E | E | E | G | |
| 54 | 6 | 8 | 0.2 | 0.015 | 28 | 14 | 12 | 2.3 | 3 | 15 | E | G | F | P | P | Comparative example |
| 55 | 6 | 8 | 0.2 | 0.015 | 28 | 16 | 10 | 2.1 | 3 | 15 | E | G | G | F | F | |
| 56 | 6 | 8 | 0.2 | 0.015 | 28 | 18 | 8 | 1.8 | 3 | 15 | E | E | G | G | G | |
| 57 | 6 | 8 | 0.2 | 0.015 | 28 | 20 | 7 | 1.6 | 3 | 15 | E | E | E | G | G | |
| 58 | 6 | 8 | 0.2 | 0.015 | 28 | 22 | 6 | 1.3 | 3 | 15 | E | E | E | E | E | |
| 59 | 6 | 8 | 0.2 | 0.015 | 28 | 24 | 5 | 1.2 | 3 | 15 | E | E | E | E | E | |
| 60 | 6 | 8 | 0.2 | 0.015 | 28 | 26 | 4 | 1.2 | 3 | 15 | E | E | E | E | E | |
| 61 | 6 | 8 | 0.2 | 0.015 | 28 | 28 | 2 | 1.2 | 3 | 15 | E | E | E | G | G | |
| 62 | 6 | 8 | 0.2 | 0.015 | 28 | 30 | 1.5 | 1.1 | 3 | 15 | E | E | E | G | G | |

TABLE 3

| No | Plating composition mass % | | | | 1st cooling °C./s | 2nd cooling °C./s | Mg$_2$Si long axis μm | Mg$_2$Si aspect ratio | Alloy layer thickness μm | Plating thickness μm | Appearance | Corrosion resistance | | | Overall evaluation | Remarks |
|---|---|---|---|---|---|---|---|---|---|---|---|---|---|---|---|---|
| | Mg | Si | Ca | Ti | | | | | | | | Degraded E10 | Degraded E25 | Degraded E100 | | |
| 63 | 6 | 8 | 0.2 | 0.015 | 28 | 26 | 6 | 1.2 | 2 | 15 | E | E | E | E | E | |
| 64 | 6 | 8 | 0.2 | 0.015 | 28 | 26 | 6 | 1.2 | 3 | 15 | E | E | E | E | E | |
| 65 | 6 | 8 | 0.2 | 0.015 | 28 | 26 | 6 | 1.2 | 4 | 15 | E | E | E | E | E | |
| 66 | 6 | 8 | 0.2 | 0.015 | 28 | 26 | 6 | 1.2 | 5 | 15 | E | E | E | E | E | |
| 67 | 6 | 8 | 0.2 | 0.015 | 28 | 26 | 6 | 1.2 | 6 | 15 | F | E | E | G | G | |
| 68 | 6 | 8 | 0.2 | 0.015 | 28 | 26 | 6 | 1.2 | 7 | 15 | F | E | G | G | G | |

TABLE 4

| No | Plating composition mass % | | | | 1st cooling °C./s | 2nd cooling °C./s | Mg$_2$Si long axis μm | Mg$_2$Si aspect ratio | Alloy layer thickness μm | Plating thickness μm | Appearance | Corrosion resistance | | | Overall evaluation | Remarks |
|---|---|---|---|---|---|---|---|---|---|---|---|---|---|---|---|---|
| | Mg | Si | Ca | Ti | | | | | | | | Degraded E10 | Degraded E25 | Degraded E100 | | |
| 69 | 6 | 8 | 0.2 | 0.015 | 28 | 26 | 6 | 1.2 | 3 | 8 | E | G | G | F | F | |
| 70 | 6 | 8 | 0.2 | 0.015 | 28 | 26 | 6 | 1.2 | 3 | 10 | E | E | G | G | G | |
| 71 | 6 | 8 | 0.2 | 0.015 | 28 | 26 | 6 | 1.2 | 3 | 12 | E | E | E | G | G | |
| 72 | 6 | 8 | 0.2 | 0.015 | 28 | 26 | 6 | 1.2 | 3 | 13 | E | E | E | E | E | |
| 73 | 6 | 8 | 0.2 | 0.015 | 28 | 26 | 6 | 1.2 | 3 | 15 | E | E | E | E | E | |
| 74 | 6 | 8 | 0.2 | 0.015 | 28 | 26 | 6 | 1.2 | 3 | 18 | E | E | E | E | E | |
| 75 | 6 | 8 | 0.2 | 0.015 | 28 | 26 | 6 | 1.2 | 3 | 20 | E | E | E | E | E | |
| 76 | 6 | 8 | 0.2 | 0.015 | 28 | 26 | 6 | 1.2 | 3 | 23 | E | E | E | E | E | |
| 77 | 6 | 8 | 0.2 | 0.015 | 28 | 26 | 6 | 1.2 | 3 | 25 | E | E | E | E | E | |
| 78 | 6 | 8 | 0.2 | 0.015 | 28 | 26 | 6 | 1.2 | 3 | 28 | E | E | E | E | E | |
| 79 | 6 | 8 | 0.2 | 0.015 | 28 | 26 | 6 | 1.2 | 3 | 31 | E | E | E | E | E | |
| 80 | 6 | 8 | 0.2 | 0.015 | 28 | 26 | 6 | 1.2 | 3 | 32 | E | E | E | E | E | |
| 81 | 6 | 8 | 0.2 | 0.015 | 28 | 26 | 6 | 1.2 | 3 | 35 | E | E | E | E | E | |
| 82 | 6 | 8 | 0.2 | 0.015 | 28 | 26 | 6 | 1.2 | 3 | 37 | E | E | E | E | E | Press formability, plating adhesion, and resistance weldability fall |
| 83 | 6 | 8 | 0.2 | 0.015 | 28 | 26 | 6 | 1.2 | 3 | 40 | E | E | E | E | E | Press formability, plating adhesion, and resistance weldability fall |
| 84 | 6 | 8 | 0.2 | 0.015 | 28 | 26 | 6 | 1.2 | 3 | 45 | E | E | E | E | E | Press formability, plating adhesion, and resistance weldability fall |

INDUSTRIAL APPLICABILITY

The plated steel sheet according to the present invention can not only be utilized in automobiles, motorcycles, buses, trucks, etc., in particular as fuel tanks of flex fuels, but can also be utilized as members in which resistance to corrosion by flex fuels etc. is demanded.

The invention claimed is:

1. Aluminum plated steel sheet which is excellent in corrosion resistance and appearance, comprising steel sheet on at least one surface of which there is a plating layer consisting of, by mass %,
   Si: 2% to 11%,
   Mg: 3% to 9%,
   Ca: 0.1% to 5%,
   Ti: 0.008% to 0.05%, and
   a balance of Al and unavoidable impurities,
   said plating layer containing clumps of $Mg_2Si$ particles with a long axis of greater than 0 μm and 10 μm or less, and a ratio of a long axis and a short axis, an aspect ratio, of 1 to 3,
   wherein the long axis and the aspect ratio are measured by examining the vertical cross-section of the plating layer.

2. Aluminum plated steel sheet which is excellent in corrosion resistance and appearance as set forth in claim 1 characterized by having an Al—Si—Fe-based alloy layer of a thickness of greater than 0 μm and 5 μm or less at the interface of said plating layer and said steel sheet.

3. Aluminum plated steel sheet which is excellent in corrosion resistance and appearance as set forth in claim 1 or 2 characterized in that said plating layer has a thickness of 9 to 35 μm.

4. A fuel tank which is excellent in corrosion resistance and appearance characterized by using aluminum plated steel sheet which has a plating layer consisting of, by mass %,
   Si: 2% to 11%,
   Mg: 3% to 9%,
   Ca: 0.1% to 5%,
   Ti: 0.008% to 0.05%, and
   a balance of Al and unavoidable impurities,
   said plating layer containing clumps of $Mg_2Si$ particles with a long axis of greater than 0 μm and 10 μm or less and a ratio of a long axis and a short axis, an aspect ratio, of 1 to 3,
   wherein the long axis and the aspect ratio are measured by examining the vertical cross-section of the plating layer.

* * * * *